(12) United States Patent
McAllister et al.

(10) Patent No.: US 9,377,940 B2
(45) Date of Patent: Jun. 28, 2016

(54) PREDICTIVE PRE-DECODING OF ENCODED MEDIA ITEM

(71) Applicant: Facebook, Inc., Menlo Park, CA (US)

(72) Inventors: Philip McAllister, San Francisco, CA (US); Shayne Sweeney, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 133 days.

(21) Appl. No.: 13/780,474

(22) Filed: Feb. 28, 2013

(65) Prior Publication Data

US 2014/0245219 A1    Aug. 28, 2014

(51) Int. Cl.
*G06F 3/0485*   (2013.01)
*G06F 17/30*    (2006.01)

(52) U.S. Cl.
CPC ........ *G06F 3/0485* (2013.01); *G06F 17/30244* (2013.01)

(58) Field of Classification Search
CPC .................. G06F 17/30244; G06F 3/0485
USPC ...................................................... 715/784
See application file for complete search history.

(56) References Cited

U.S. PATENT DOCUMENTS

| | | | | |
|---|---|---|---|---|
| 5,394,523 A * | 2/1995 | Harris | ............................ | 345/501 |
| 5,515,081 A * | 5/1996 | Vasilik | ............................ | 345/545 |
| 5,764,238 A * | 6/1998 | Lum et al. | ...................... | 345/660 |
| 5,805,133 A * | 9/1998 | Priem et al. | .................... | 345/686 |
| 6,002,401 A * | 12/1999 | Baker | ............................ | 715/839 |
| 6,167,404 A * | 12/2000 | Morcos et al. | | |
| 6,263,396 B1 * | 7/2001 | Cottle et al. | .................. | 710/263 |
| 6,433,885 B1 * | 8/2002 | Verghese et al. | ............. | 358/1.15 |
| 2002/0118890 A1 * | 8/2002 | Rondinelli | ..................... | 382/276 |
| 2004/0054894 A1 * | 3/2004 | Lambert | ....................... | 713/165 |
| 2005/0001848 A1 * | 1/2005 | Colavin | ........................ | 345/566 |
| 2005/0111556 A1 * | 5/2005 | Endress et al. | ........... | 375/240.23 |
| 2007/0027959 A1 * | 2/2007 | Harris et al. | .................. | 709/217 |
| 2008/0092078 A1 * | 4/2008 | Takeshima et al. | ........... | 715/786 |
| 2008/0134079 A1 * | 6/2008 | Brunner et al. | ................ | 715/784 |
| 2008/0320396 A1 * | 12/2008 | Mizrachi | ........... | H04M 1/72561  715/744 |
| 2009/0161552 A1 * | 6/2009 | Rible | ............................ | 370/241 |
| 2010/0031186 A1 * | 2/2010 | Tseng et al. | ................... | 715/786 |
| 2010/0129053 A1 * | 5/2010 | Ito | ................................... | 386/69 |
| 2011/0090253 A1 * | 4/2011 | Good | ............................ | 345/633 |
| 2011/0216981 A1 * | 9/2011 | Hiraga et al. | ................. | 382/233 |

(Continued)

OTHER PUBLICATIONS

Chen, W. Prefetching techniques to rebuild caches associated with bitmaps. Jun. 22, 2009.*

(Continued)

*Primary Examiner* — Tadeese Hailu
*Assistant Examiner* — Alvaro R Calderon, IV
(74) *Attorney, Agent, or Firm* — Van Pelt, Yi & James LLP

(57) ABSTRACT

Displaying a plurality of encoded media items on a device includes: detecting that a first scrolling action has been completed; determining a predicted next encoded media item to be displayed; obtaining the predicted next encoded media item from a first memory; pre-decoding the predicted next encoded media item to generate a pre-decoded media item; storing the pre-decoded media item in a second memory, the second memory having lower latency than the first memory; receiving an indication that a second scrolling action has begun; and in response to the second scrolling action, displaying the pre-decoded media item via a display interface.

21 Claims, 11 Drawing Sheets

(56) References Cited

U.S. PATENT DOCUMENTS

2012/0235933 A1* 9/2012 Yamamura et al. ........... 345/173
2012/0266068 A1* 10/2012 Ryman et al. ................. 715/719
2012/0327097 A1* 12/2012 Mostafa et al. ............... 345/555
2013/0080968 A1* 3/2013 Hanson et al. ................ 715/783
2013/0339807 A1* 12/2013 Umeroglu et al. ............. 714/49

OTHER PUBLICATIONS

Bitmap Class. Android Developers. Aug. 5, 2009.*

* cited by examiner

PREDICTIVE PRE-DECODING OF ENCODED MEDIA ITEM

BACKGROUND OF THE INVENTION

Mobile devices such as smartphones have become ubiquitous. Popular applications such as Instagram™ allow users to share and view photos via their mobile devices. Users often want to view a large number of photos on their devices quickly, by scrolling through the images. However, mobile devices currently tend to have limited amounts of memory, which can lead to performance issues. When a user attempts to view tens or even hundreds of photos using a mobile device, the processing time required can prevent photos from being displayed instantaneously. For example, on Android™ operating system-based smartphones, the operating system will only maintain a few most recently accessed images in memory, and evict older image bitmaps from memory as a part of the memory management scheme. The evicted bitmaps would need to be reprocessed and loaded back into memory when needed, resulting in a jittery display of images when the user scrolls through the images. Better management and display of images is needed to provide a more satisfying user experience when scrolling through photos.

BRIEF DESCRIPTION OF THE DRAWINGS

Various embodiments of the invention are disclosed in the following detailed description and the accompanying drawings.

DETAILED DESCRIPTION

Figure 1:
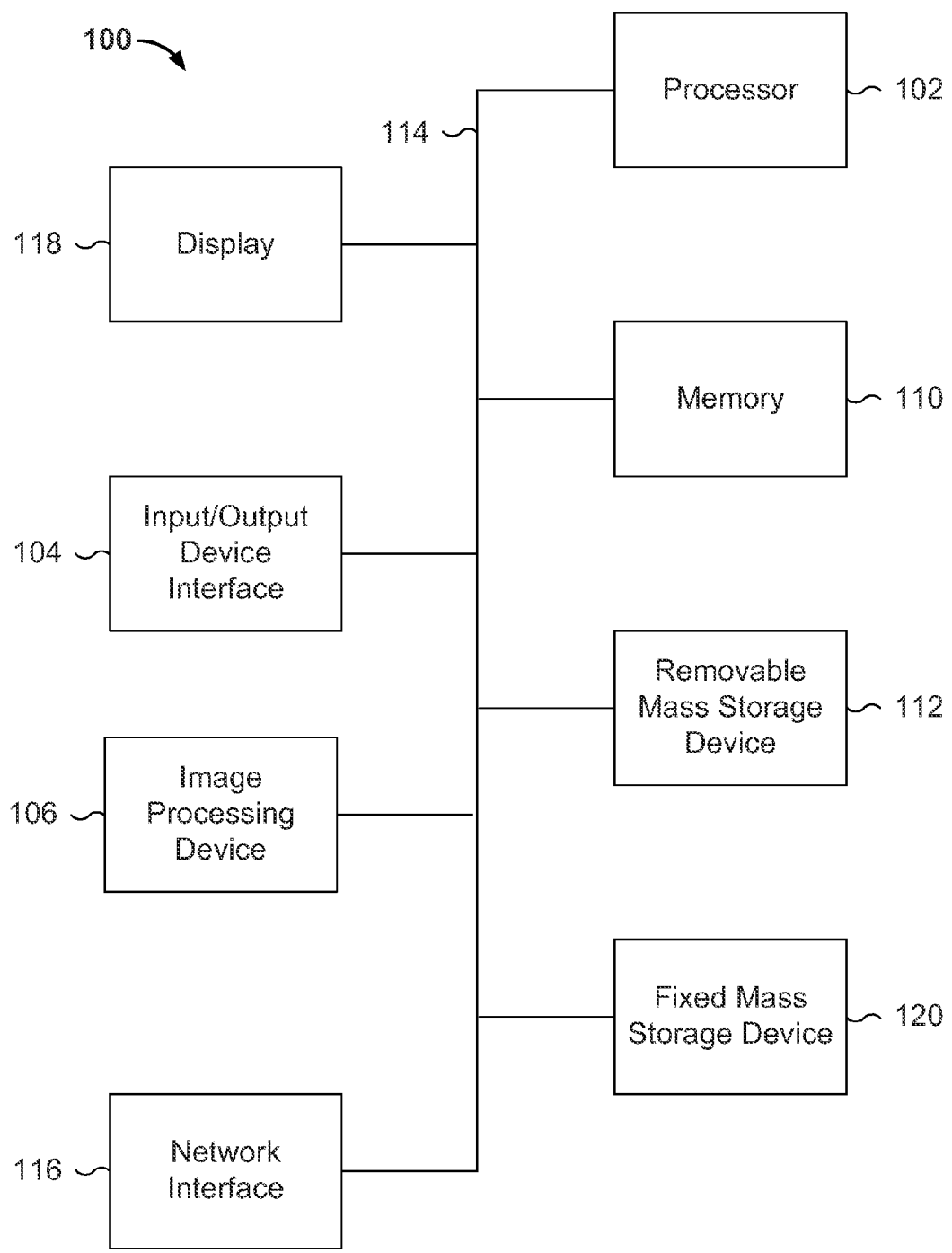
FIG. 1 is a functional diagram illustrating a programmed computer system for displaying media items in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Displaying a plurality of encoded media items on a device is disclosed. The encoded media items can be, for example, image files in Joint Photographic Experts Group (JPEG) or other compressed formats. In some embodiments, the encoded media items are decoded and displayed when the user makes a request for a scrolling action. When the scrolling action stops, a predicted next encoded media item to be displayed is determined. The predicted next encoded media item is fetched from a first memory component such as a disk, a secure digital (SD) card, a flash drive, or the like. The predicted next encoded media item is pre-decoded (e.g., from JPEG into bitmap), and the decoded media item is stored in a second memory component such as random access memory (RAM). When an indication that a second scrolling action has begun is received, the decoded media item is displayed. Because the pre-decoded data is stored in the second, lower latency memory, displaying the decoded media item in response to the second scrolling action does not incur significant processing overhead, and results in smooth display of the items and a pleasing user experience.

FIG. 1 is a functional diagram illustrating a programmed computer system for displaying media items in accordance with some embodiments. As will be apparent, other computer system architectures and configurations can be used to perform the described media item display technique. Computer system 100 can be a mobile device such as a smartphone, a portable device such as a tablet or laptop computer, a desktop system, or the like. Computer system 100, which includes various subsystems as described below, includes at least one microprocessor subsystem (also referred to as a processor or a central processing unit (CPU) 102. For example, processor 102 can be implemented by a single-chip processor or by multiple processors. In some embodiments, processor 102 is a general purpose digital processor that controls the operation of the computer system 100. In some embodiments, processor 102 also includes one or more coprocessors or special purpose processors (e.g., a graphics processor, a network processor, etc.). Using instructions retrieved from memory 110, processor 102 controls the reception and manipulation of input data received on an input device (e.g., image processing device 106, I/O device interface 104), and the output and display of data on output devices (e.g., display 118).

Processor 102 is coupled bi-directionally with memory 110, which can include, for example, one or more random access memories (RAM) and/or one or more read-only memories (ROM). As is well known in the art, memory 110 can be used as a general storage area, a temporary (e.g., scratch pad) memory, and/or a cache memory. Memory 110 can also be used to store input data and processed data, as well as to store programming instructions and data, in the form of data objects and text objects, in addition to other data and instructions for processes operating on processor 102. Also as is well known in the art, memory 110 typically includes basic operating instructions, program code, data, and objects used by the processor 102 to perform its functions (e.g., programmed instructions). For example, memory 110 can include any suitable computer readable storage media described below, depending on whether, for example, data access needs to be bi-directional or uni-directional. For example, processor 102 can also directly and very rapidly retrieve and store frequently needed data in a cache memory included in memory 110.

A removable mass storage device 112 provides additional data storage capacity for the computer system 100, and is optionally coupled either bi-directionally (read/write) or unidirectionally (read only) to processor 102. A fixed mass storage 120 can also, for example, provide additional data storage capacity. For example, storage devices 112 and/or 120 can include computer readable media such as magnetic tape, flash memory, PC-CARDS, portable mass storage devices such as hard drives (e.g., magnetic, optical, or solid state drives), holographic storage devices, and other storage devices. Mass storages 112 and/or 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can be used to provide access to other subsystems and devices as well. As shown, these can include a display 118, a network interface 116, an input/output (I/O) device interface 104, an image processing device 106, as well as other subsystems and devices. For example, image processing device 106 can include a camera, a scanner, etc.; I/O device interface 104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 100. Multiple I/O device interfaces can be used in conjunction with computer system 100. The I/O device interface can include general and customized interfaces that allow the processor 102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 116 allows processor 102 to be coupled to another computer, computer network, or telecommunications network using a network connection as shown. For example, through the network interface 116, the processor 102 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 104 and display 118 share the touch sensitive screen component, which both detects user inputs and displays outputs to the user). In addition, bus 114 is illustrative of any interconnection scheme serving to link the subsystems. Other computer architectures having different configurations of subsystems can also be utilized.

Figure 2:
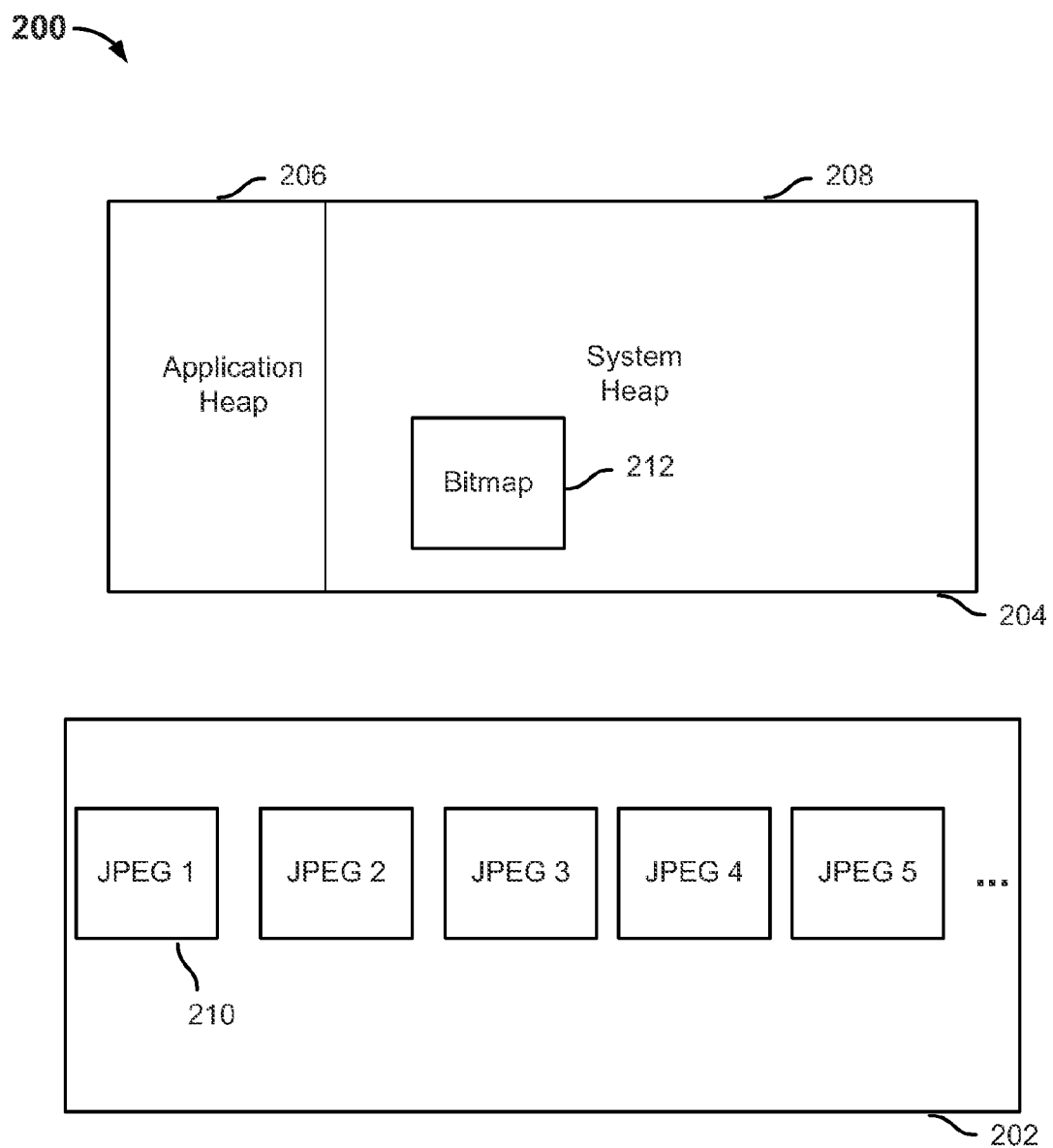
FIG. 2 is a block diagram illustrating an embodiment of a memory subsystem of a system configured to display media items.

FIG. 2 is a block diagram illustrating an embodiment of a memory subsystem of a system configured to display media items. In some embodiments, memory subsystem 200 can be used to implement memory 110 and/or fixed mass storage device 120 of system 100. In this example, an Android™-based memory layout is described, although similar layout is applicable to other operating systems. The system includes a first memory 202 and a second memory 204. First memory 202 can be implemented using a disk such as a secure digital (SD) disk, a flash drive, etc., and second memory 204 can be implemented using random access memory (RAM). The first memory typically has higher latency than the second memory. Since higher latency memory tends to be less expensive than lower latency memory, the amount of space available on first memory 202 is typically greater than the amount of space available on second memory 204.

In the example shown, encoded media items (e.g., images) 210 are stored on first memory 202. These media items may be downloaded from a server or other designated storage location. The media items can be encoded in a variety of formats for purposes of compression, security, etc. For example, the media items can be in a compressed format such as Joint Photographic Experts Group (JPEG) files. In some embodiments, a set of media items (referred to as a feed) to be downloaded are specified using JavaScript Object Notation (JSON). The JSON file lists the items in the order they are stored on the server, with universal resource locators (URLs) linked to the locations of the items. When the user wishes to view a feed on his device, the image viewing application sends a request to the server, which sends the JSON file to the application. The application creates queues to retrieve the encoded media items from the locations listed in the URLs, and stores them on the first memory.

Second memory 204 is divided into an application heap 206 (e.g., Java heap in Android®-based devices) and a system heap 208 (e.g., native heap in Android®-based devices). In some embodiments, the operating system heap provides facilities for managing the second memory. For example, for Android™ enabled devices, Anonymous Shared Memory (ashmem) and related application programming interfaces (APIs) are used by the operating system to manage shared memory on the system heap.

When the application needs to display a media item, an API call is made. The API call is allowed to access application heap 206. If the decoded form of the media item (e.g., the bitmap image data 212) is already available in system heap 208, it is copied from system heap 208 into application heap 206 and displayed according to the API call. If, however, the decoded form is not yet available in system heap 208, the corresponding encoded media item (e.g., the JPEG file) is retrieved from first memory 202, decoded and stored in system heap 208, transferred to application heap 206, and displayed. Since the size of the system heap tends to be small and can only store a small number of bitmaps in its cache, the operating system can evict any bitmap that has not been recently used from system heap 208 to make room for new bitmaps. If an evicted bitmap is needed again, its corresponding JPEG file would need to be reloaded from first memory 202 and decompressed again. Thus, when the user is scrolling through the images, there can be a time lag in displaying the images due to the time required for loading and decompression, causing the user to be unable to view the image instantaneously. The delayed display of the image (also referred to as stutter) results in a poor user experience.

Figure 3:
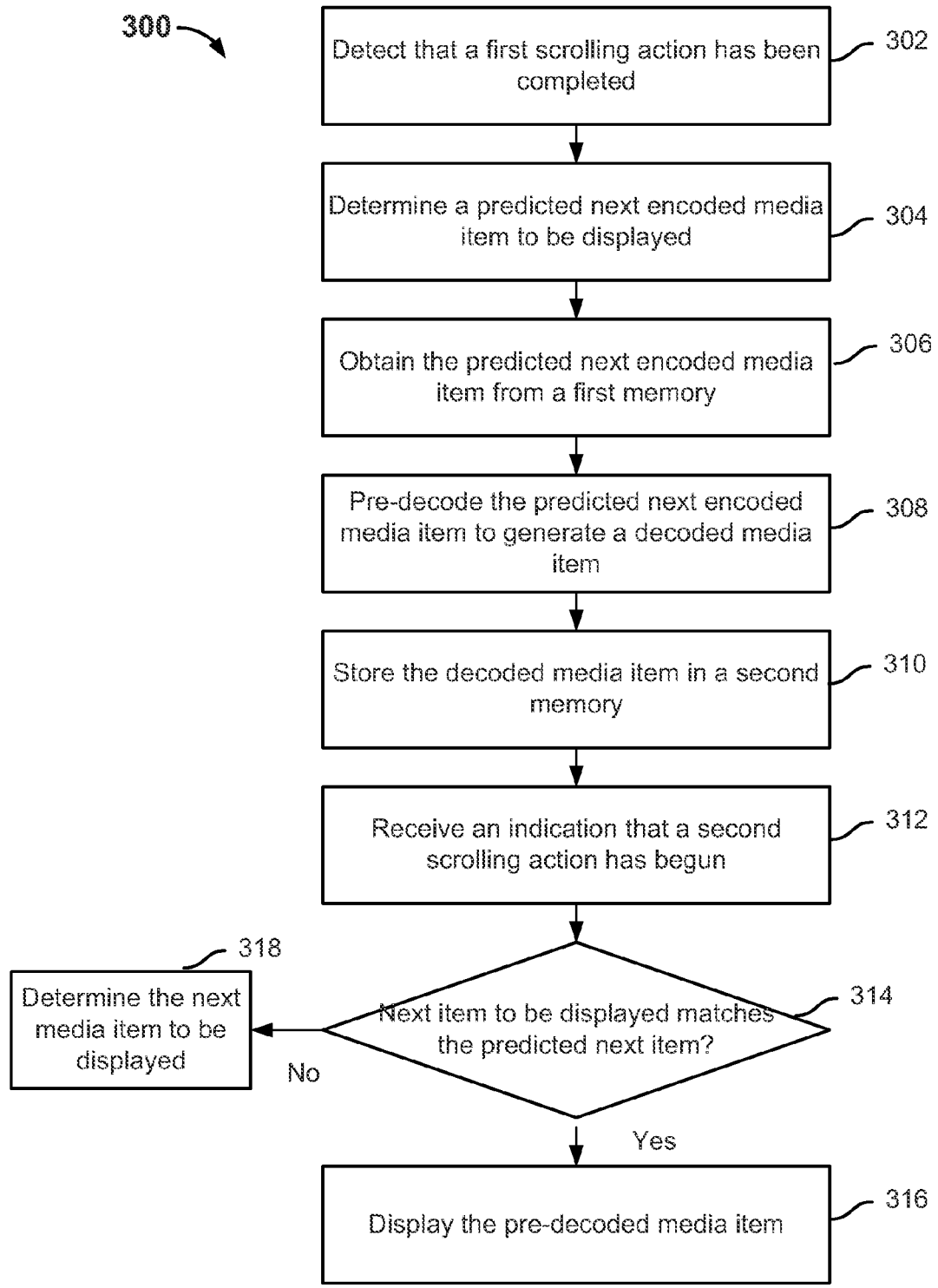
FIG. 3 is an embodiment of a process for displaying a plurality of encoded media items on a device.

To improve the user experience of scrolling and viewing media items, an image "warming" technique is employed where a prediction of which media item will be displayed next is made, and the predicted item is pre-decoded so that it is available in the system heap before the user requests it. FIG. 3 is an embodiment of a process for displaying a plurality of encoded media items on a device. Process 300 can be implemented on a device such as device 100. Preferably, process 300 is performed by the User Interface (UI) thread to ensure that decoding and displaying of the next media item is completed before other actions are allowed to proceed.

At 302, it is detected that a first scrolling action has been completed. In some embodiments, the user performs a scrolling action by swiping a finger across the touch sensitive screen. The UI thread detects that the scrolling action has been completed when it is detected that the user's finger is lifted from the screen. Images are displayed based on the sequence in which they are stored at the original storage location (e.g., the server). Standard APIs control which images are displayed in response to the first scrolling action according to the distance and speed of the swipe. For example, when the user scrolls down, the images are displayed in the same order as they are stored; when the user scrolls up, the images are displayed in the reverse order as they are stored. The user may also scroll diagonally to navigate a two-dimensional layout of the images.

At 304, a predicted next encoded media item to be displayed is determined. In some embodiments, the prediction depends on the direction of the first scrolling action. Based on the current position (i.e., the position of the media item at which scrolling stopped), the next media item in the direction of the first scrolling action is the predicted next item to be displayed.

At 306, the predicted next encoded media item is obtained from a first memory. For example, referring to FIG. 2, the JPEG image that corresponds to the predicted next encoded media item is obtained from memory 202. In cases where multiple predicted next encoded media items are determined, these items are obtained from the first memory.

At 308, the predicted next encoded media item is pre-decoded (i.e., decoded before any request to display the item is received) to generate a pre-decoded media item. For example, the retrieved JPEG image is uncompressed into a bitmap image.

At 310, the pre-decoded media item is stored in a second memory. For example, referring to FIG. 2, the bitmap image is stored in memory 204.

At 312, an indication that a second scrolling action has begun is received. In some embodiments, the indication corresponds to an event that is initiated upon the start of the second scrolling action.

At 314, it is determined if the next item to be displayed in response to the second scrolling action matches the predicted next item. If so, at 316, the pre-decoded media item that is stored in the second memory is retrieved and displayed in response to the second scrolling action; otherwise, at 318, the next item to be displayed (which is not necessarily pre-decoded) in response to the second scrolling action is determined and displayed.

Although the above process describes predicting a single next item, in some embodiments, multiple predicted next encoded media items to be displayed are determined, retrieved, decoded, and displayed.

Figure 4:
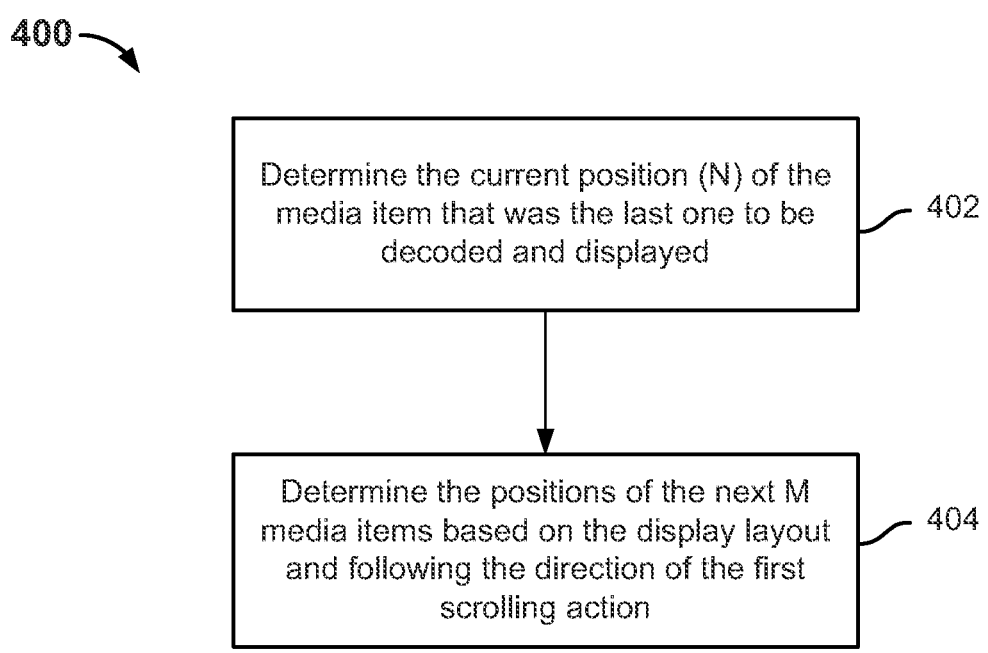
FIG. 4 is a flowchart illustrating an embodiment of a process for determining the next encoded media item to be displayed.

FIG. 4 is a flowchart illustrating an embodiment of a process for determining the next encoded media item to be displayed. In some embodiments, process 400 is used to implement 304 or 318 of process 300.

At 402, the position of the last media item that was decoded and displayed in response to the first scrolling action is determined.

It is assumed that when a user scrolls to view the media items, he will often scroll in the same direction as he has been. At 404, based on the position of the last decoded item and the display layout, and following the direction of the first scrolling action, the position(s) of the next M media item(s) is (are) determined. Assume that the position of the last media item is N, then the positions of the next M media items are N+1, ..., N+M. The value of M is an integer greater or equal to 1. The next M media items can be the predicted next encoded media items (if 400 is used to implement step 304) or the next M media items to be displayed (if 400 is used to implement step 418).

The value of M is configurable. In some embodiments, the value of M is determined empirically or based on system memory availability in some embodiments. While a high M is desirable for buffering a greater number of bitmap images in memory cache and minimizing delays in displaying the images, too high an M can cause recently displayed media items to be evicted from memory cache, leading to display stutter should the user reverse scrolling direction. Thus, in some embodiments, the value of M is chosen such that the probability of the last decoded and displayed image to be evicted from memory cache (or equivalently, the probability of encountering display stutter when scrolling direction is reversed) is below some threshold. In the following discussion, it is assumed that M=1, although other values of M can be used.

Figure 5A:
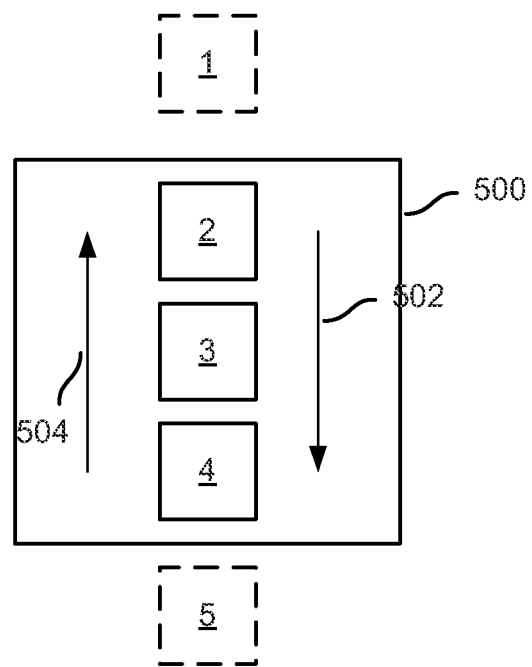
FIGS. 5A-5C are diagrams illustrating the determination of the predicted next encoded media item.
Figure 5B:
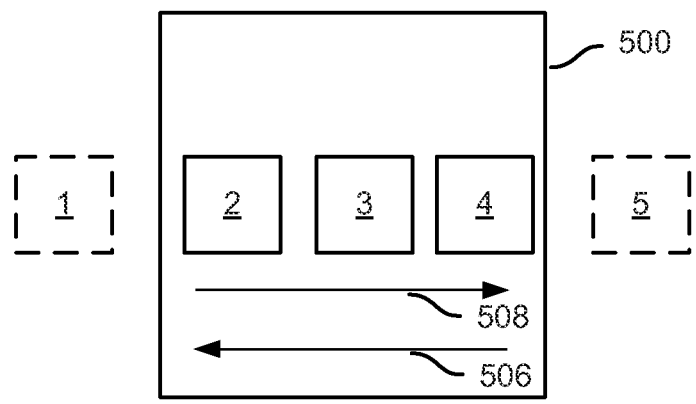
Figure 5C:
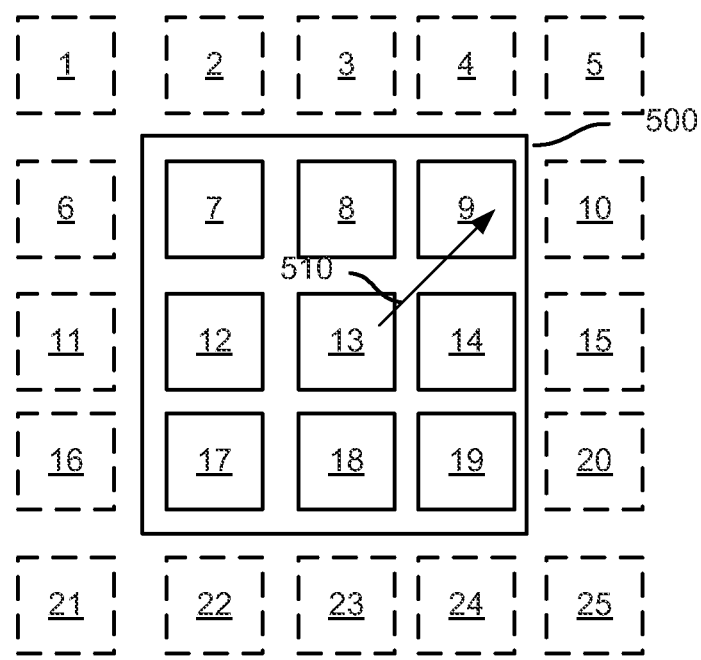

Process 400 is further explained in connection with FIGS. 5A-5C. FIGS. 5A-5C are diagrams illustrating the determination of the predicted next encoded media item. In this example, images are sequentially numbered in the same order in which they are stored at the server. In FIG. 5A, images 2, 3, and 4 are displayed on screen 500 in a column, and images 1 and 5 are currently not displayed (but shown in dashed boxes to indicate their relative positions). If the direction of the first scrolling action is up, as illustrated by arrow 502, then, in step 402, the location of the last item that was decoded in response to the first scrolling action is determined to be 4. In step 404, based on the position of the last decoded item and the vertical display layout, and following the direction of the first scrolling action, the position of the predicted next encoded media item is image 5. If the direction of the first scrolling action is down, as illustrated by arrow 504, the predicted next encoded media item is image 1. In FIG. 5B, images 2, 3, and 4 are displayed on screen 500 in a row. Similarly, the direction of the first scrolling action is to the left, as illustrated by arrow 506, the predicted next encoded media item is image 5. If the direction of the first scrolling action is to the right, as illustrated by arrow 508, the predicted next encoded media item is image 1.

Other display schemes are possible and the determination of the last item that was decoded and displayed can depend on the direction of the user scrolling action. For example, the images can also be displayed in a two-dimensional grid as shown in FIG. 5C. In this example, images 7-9, 12-14, and 17-19 are currently displayed on screen 500 while the rest of the images (represented using dashed boxes) are not displayed. A mapping of specific image positions and the direction of the user scrolling action is used to determine which image is deemed to be the last decoded item. For example, if the user scrolls in the direction according to arrow 510, the last item that was decoded is deemed to be image 9 and the predicted next encoded media item is image 5. If the user scrolls in the opposite direction as arrow 510, the last item that was decoded is deemed to be item 17 and the predicted next encoded media item is image 21.

Figure 6:
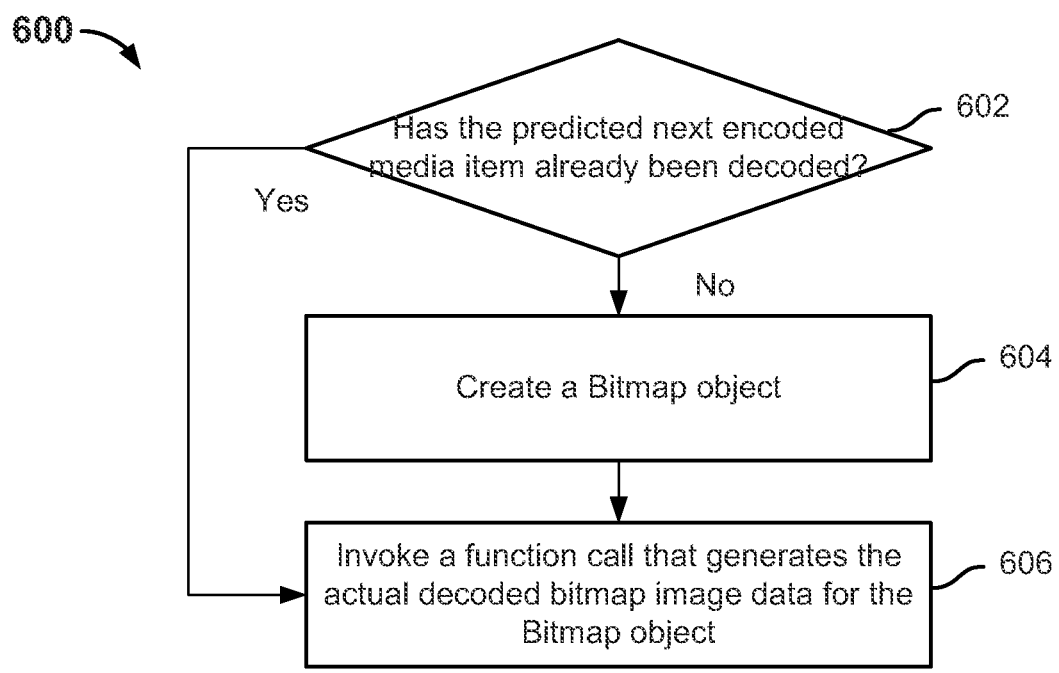
FIG. 6 is a flowchart illustrating an embodiment of a process for pre-decoding the predicted next encoded media item.

FIG. 6 is a flowchart illustrating an embodiment of a process for pre-decoding the predicted next encoded media item. In some embodiments, process 600 is used to implement step 308 of process 300.

If it is assumed that M=1, then at 602, it is determined whether the predicted next encoded media item has already been decoded. In some embodiments, the determination is made by checking whether a Bitmap object associated with the predicted next encoded media item already exists in the system heap. If decoding has taken place (e.g., the user has already scrolled through/viewed the predicted next encoded media item), there is no need to decode the item again and the process proceeds to step 606.

If decoding has not taken place, the predicted next encoded media item is decoded. Specifically, at 604, a Bitmap object corresponding to the predicted next encoded media item is created based on the Bitmap class provided by the programming framework for the device (e.g., Java® for Android®). The Bitmap class provides various attributes and methods associated with the behaviors and states of a Bitmap object. According to existing APIs and the Bitmap class definition provided by Android® platform, when a Bitmap object is created, it is stored in a system heap and is managed by ashmem. The Bitmap object includes the actual decoded bitmap image data as one of its attributes. However, there is no guarantee that the actual bitmap image data is inflated within the Bitmap object (i.e., no guarantee that the actual bitmap data has been generated and is stored in cache memory on the system heap), only that when the actual bitmap image data is needed (e.g., as requested by another API call), it will be made available. In other words, the Bitmap class does not necessarily decode the JPEG files into actual bitmap image data as soon as the Bitmap object is created, but may perform the decoding process and generate the actual bitmap image data later on an as-needed basis. This artifact of Bitmap implementation can result in stutter when the predicted next encoded media item needs to be displayed, since some time is needed to generate the actual bitmap image data. To address this issue, at 606, a function call is invoked to ensure that the actual decoded bitmap image data is generated and stored in cache. Any function call that generates the actual decoded bitmap image data can be used, including those for which the generation of the actual decoded bitmap image data is incidental to the functions' main purpose. For example, a function call to obtain the entire decoded bitmap can be used; however, the return value (e.g., the entire bitmap) is returned to the application heap, and would occupy valuable application heap space before the bitmap is needed. Thus, preferably, the function call should return a minimal amount of data. An example of such a function call is Bitmap.GetPixel, which requests the value of a single pixel in the Bitmap object by decoding the actual bitmap image data and loading it into cache memory in the system heap. When another function call is invoked for displaying the bitmap image in response to a second scrolling action, there is a cache hit and the bitmap image data is provided to the function call without delay. The result of the function call is returned to the application heap, which has very limited memory. By getting the value of just one pixel, a minimal amount of space is taken up in the application heap.

Figure 7A:
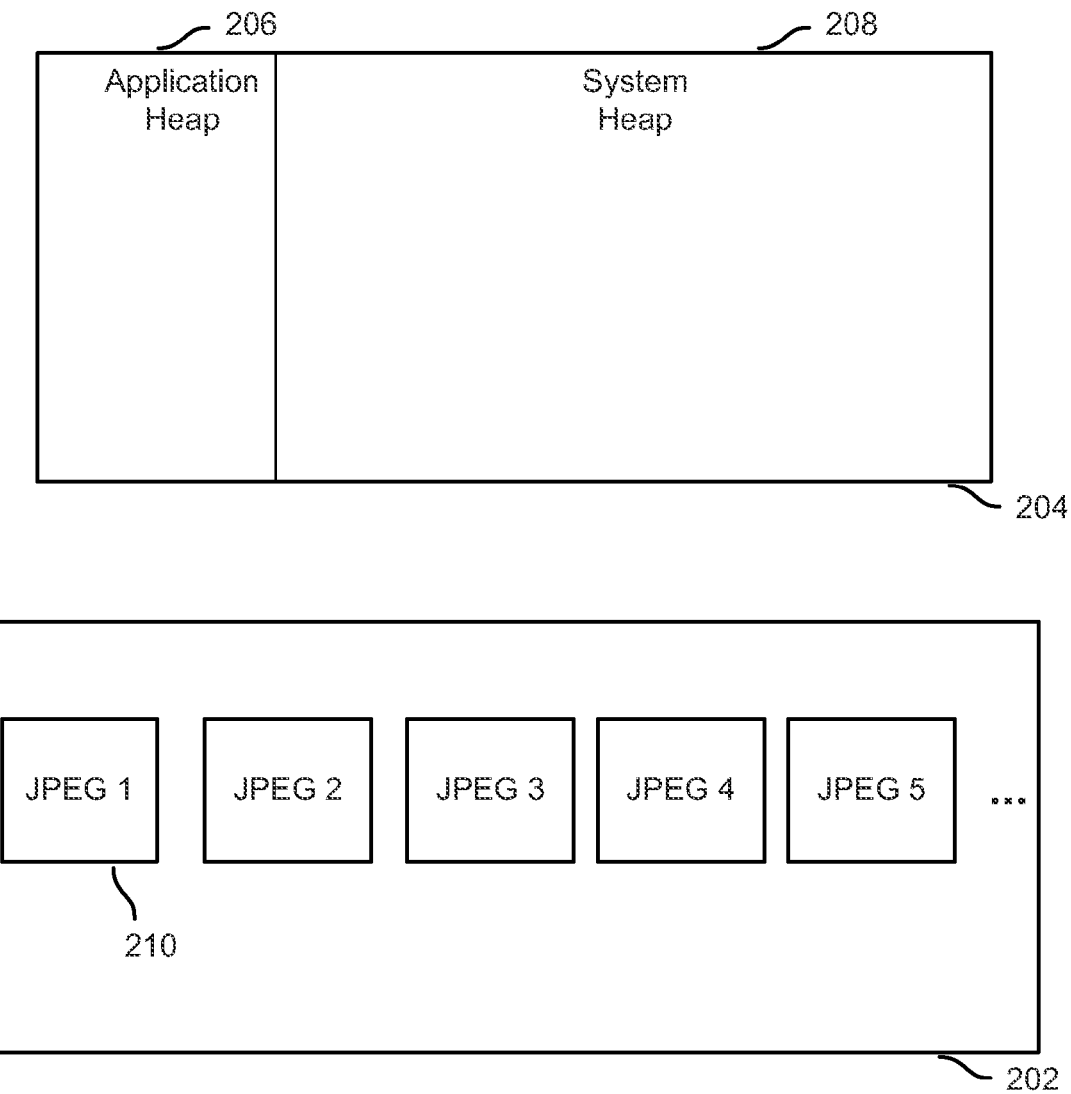
FIGS. 7A-7D illustrate example data structures that appear in different parts of the memory during the scrolling process.
Figure 7B:
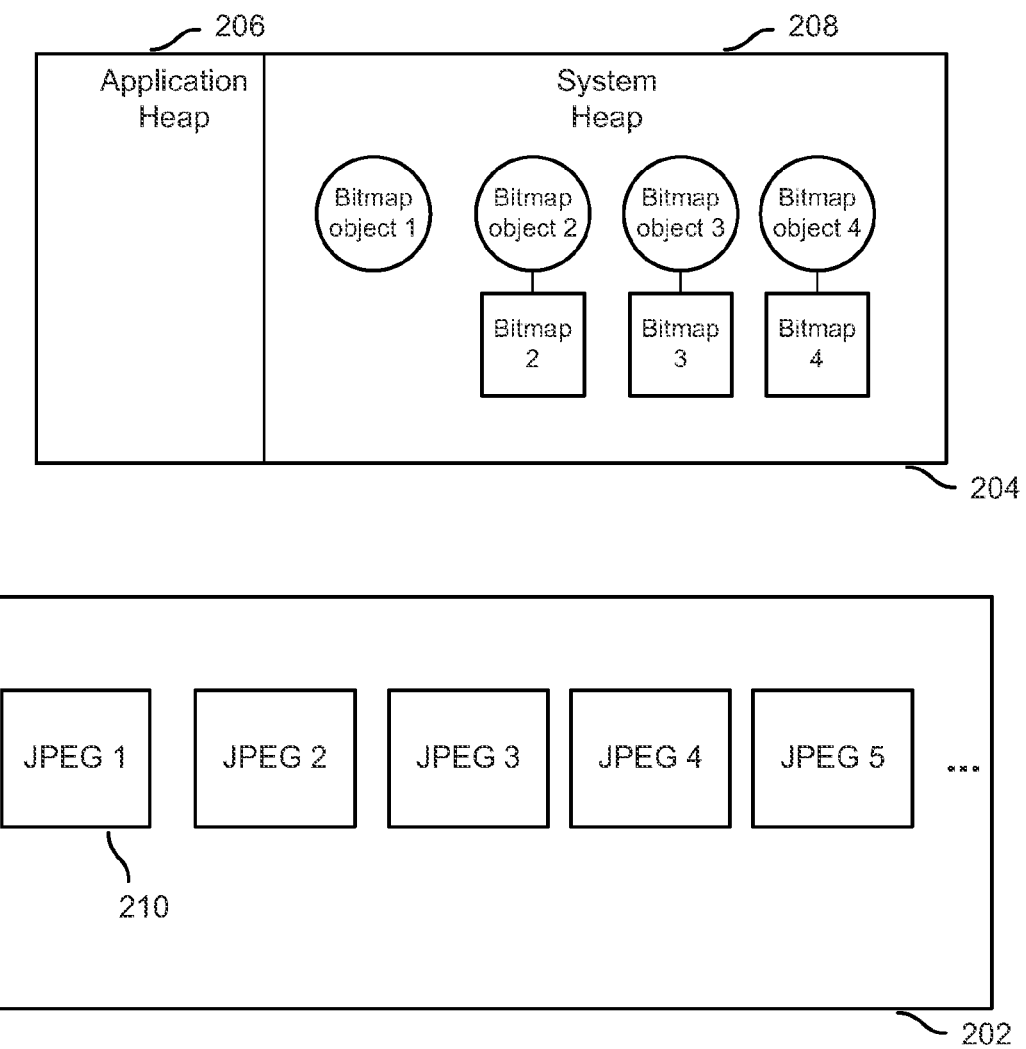
Figure 7C:
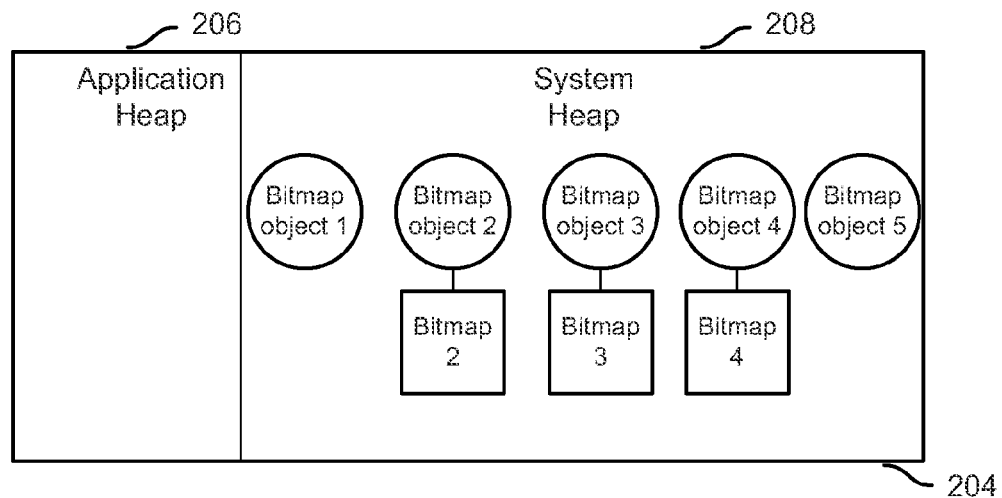
Figure 7C:
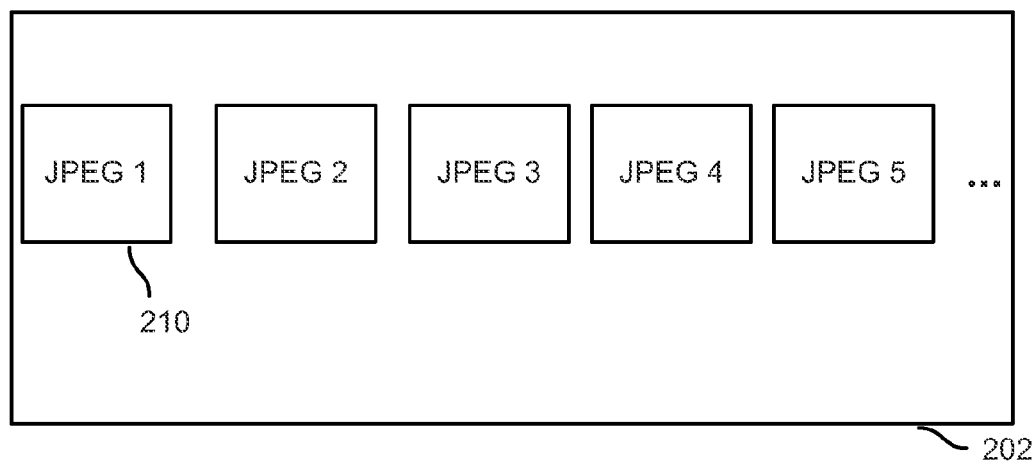
Figure 7D:
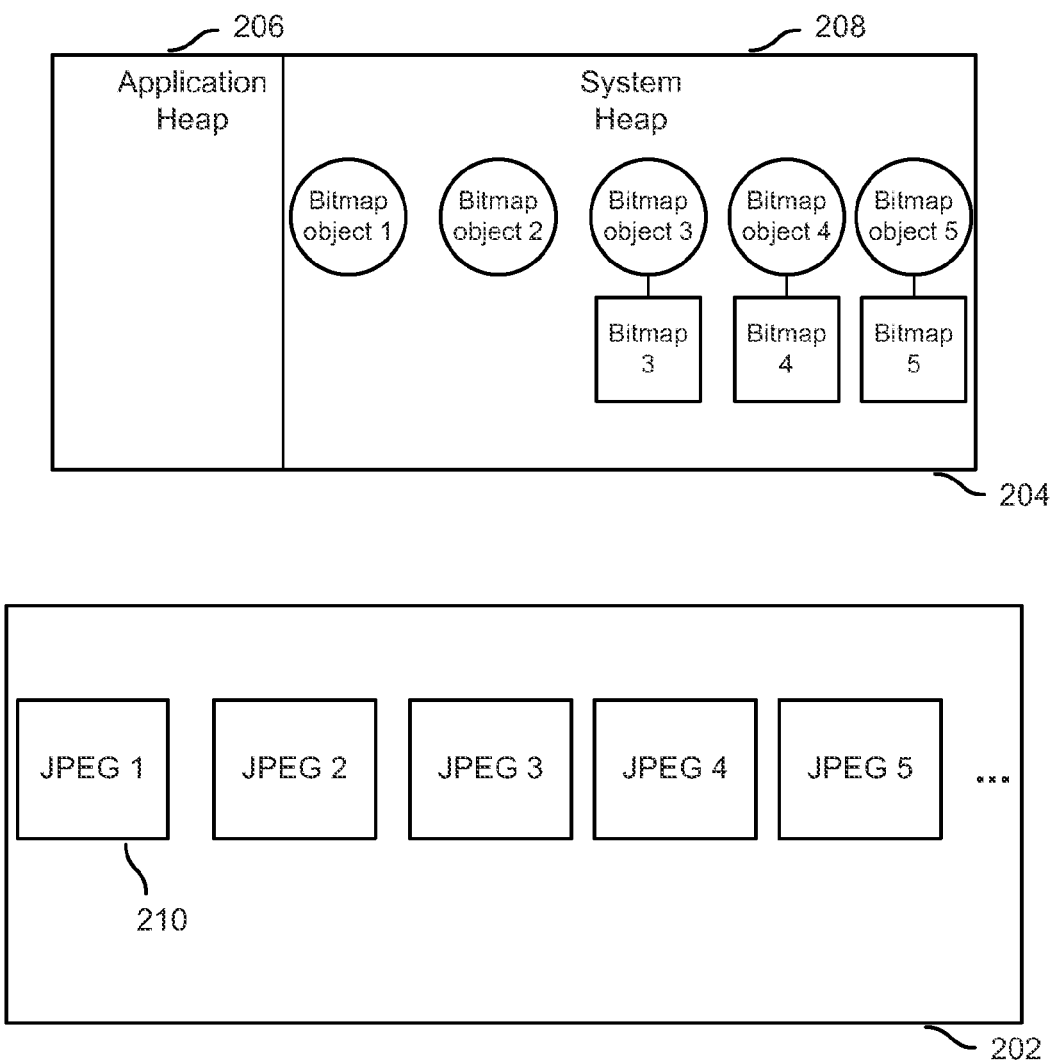

Process 600 is further explained in connection with FIGS. 7A-7D. FIGS. 7A-7D illustrate example data structures that appear in different parts of the memory during the scrolling process. The memory layout is similar to what is shown in FIG. 2. Initially, as shown in FIG. 7A, encoded media items, specifically JPEG files numbered 1-5, are downloaded from the server onto first memory 202. The number of files is for purposes of illustration only and a different number of files can be present in other embodiments. Once the user begins the first scrolling action, Bitmap objects are created in second memory 204, specifically in system heap 208. In this example, as shown in FIG. 7B, Bitmap objects corresponding to JPEG files 1-4 are created. It is determined that item 4 is the last decoded item in response to the scrolling action. In this example, the system heap only has enough space to store three decoded bitmap images. Thus, only Bitmap objects 2-4 have corresponding decoded bitmap image data in the system heap, and the bitmap image data corresponding to Bitmap object 1 has been evicted and no longer exists in the system heap. FIG. 7C shows that upon determining that item 5 is the predicted next encoded media item to be displayed, and that item 5 has not yet been decoded (step 602), a Bitmap object corresponding to item 5 is created in system heap 208 (step 604). At this point, JPEG file 5 has not yet been decoded and the actual decoded bitmap image data is not yet available in the system heap. Next, a GetPixel call is made on Bitmap object 5 (step 606). As shown in FIG. 7D, at this point, JPEG file 5 is decoded, and the corresponding actual decoded bitmap image data is created in system cache. The decoded bitmap image data for Bitmap object 2, however, is evicted from memory to make room for the bitmap of Bitmap object 5.

Predictive pre-decoding of encoded media items has been disclosed. Although the embodiments described above use JPEG files for purposes of illustration, the technique is also applicable to other encoded media item types. For example, the encoded media items can include compressed video files (e.g., Moving Picture Experts Group (MPEG) files) for which selected frames are used to represent the media items and displayed to the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an input interface configured to detect that a first scrolling action has been completed;
one or more computer processors coupled to the input interface, configured to:
determine a predicted next encoded media item to be displayed;
obtain the predicted next encoded media item from a first memory;
pre-decode, using the one or more computer processors, the predicted next encoded media item to generate a pre-decoded media item, the pre-decoding including:
creating an object that does not initially include actual decoded data;
invoking a function call, wherein the function call: obtains a value of a single pixel associated with the object, stores the obtained value of the single pixel in an application heap, the application heap being included in a second memory, and decodes data that is not in bitmap format to generate the actual decoded data that is in bitmap format;
store the pre-decoded media item to the second memory, the second memory having lower latency than the first memory, and the second memory including the application heap and a system heap; and
receive an indication that a second scrolling action has begun; and
a display interface coupled to the one or more computer processors, configured to display the pre-decoded media item in response to the second scrolling action.

2. The system of claim 1, wherein the input interface and the display interface comprise a touch-sensitive screen.

3. The system of claim 1, wherein to determine the predicted next encoded media item includes to:
determine a last decoded media item that was last decoded in response to the first scrolling action;
detect a direction of the first scrolling action; and
based on a location of the last decoded media item, identify a next media item in the direction of the first scrolling action as the predicted next encoded media item.

4. The system of claim 1, wherein the predicted next encoded media item includes a Joint Photographic Experts Group (JPEG) file.

5. The system of claim 1, wherein the pre-decoded media item includes a bitmap.

6. The system of claim 1, wherein:
the object includes a Bitmap object created based on the predicted next encoded media item; and
the function call includes a function call that generates an actual decoded bitmap image data for the Bitmap object.

7. The system of claim 6, wherein the actual decoded bitmap image data is stored on the second memory.

8. The system of claim 1, wherein the predicted next encoded media item is one of M predicted next encoded media items that are determined.

9. The system of claim 8, wherein M is determined based at least on a probability that a last decoded media item is evicted from the second memory.

10. The system of claim 1, wherein the first memory from which the predicted next encoded media item is obtained and the second memory to which the pre-decoded media item is stored are located on one device.

11. A method, comprising:
detecting, via an input interface, that a first scrolling action has been completed;
determining a predicted next encoded media item to be displayed;
obtaining the predicted next encoded media item from a first memory;
pre-decoding, using one or more computer processors, the predicted next encoded media item to generate a pre-decoded media item, the pre-decoding including:
creating an object that does not initially include actual decoded data;
invoking a function call, wherein the function call: obtains a value of a single pixel associated with the object, stores the obtained value of the single pixel in an application heap, the application heap being included in a second memory, and decodes data that is not in bitmap format to generate the actual decoded data that is in bitmap format;
storing the pre-decoded media item in the second memory, the second memory having lower latency than the first memory, and the second memory including the application heap and a system heap;
receiving an indication that a second scrolling action has begun; and
in response to the second scrolling action, displaying the pre-decoded media item via a display interface.

12. The method of claim 11, wherein determining the predicted next encoded media item includes:
determining a last decoded media item that was last decoded in response to the first scrolling action;
detecting a direction of the first scrolling action; and
based on a location of the last decoded media item, identifying a next media item in the direction of the first scrolling action as the predicted next encoded media item.

13. The method of claim 11, wherein the predicted next encoded media item includes a Joint Photographic Experts Group (JPEG) file.

14. The method of claim 11, wherein the pre-decoded media item includes a bitmap.

15. The method of claim 11, wherein:
the object includes a Bitmap object based on the predicted next encoded media item; and
the function call includes a function call that generates an actual decoded bitmap image data for the Bitmap object.

16. The method of claim 15, wherein the actual decoded bitmap image data is stored on the second memory.

17. The method of claim 11, wherein the predicted next encoded media item is one of M predicted next encoded media items that are determined.

18. The method of claim 17, wherein M is determined based at least on a probability that a last decoded media item is evicted from the second memory.

19. The method of claim 11, wherein the first memory from which the predicted next encoded media item is obtained and the second memory to which the pre-decoded media item is stored are located on one device.

20. A computer program product for displaying a plurality of encoded media items on a device, the computer program product being embodied in a tangible non-transitory computer readable storage medium and comprising computer instructions for:
detecting, via an input interface, that a first scrolling action has been completed;

determining a predicted next encoded media item to be displayed;
obtaining the predicted next encoded media item from a first memory;
pre-decoding, using one or more computer processors, the predicted next encoded media item to generate a pre-decoded media item, the pre-decoding including:
   creating an object that does not initially include actual decoded data;
   invoking a function call, wherein the function call: obtains a value of a single pixel associated with the object, stores the obtained value of the single pixel in an application heap, the application heap being included in a second memory, and decodes data that is not in bitmap format to generate the actual decoded data that is in bitmap format;
storing the pre-decoded media item in the second memory, the second memory having lower latency than the first memory, and the second memory including the application heap and a system heap;
receiving an indication that a second scrolling action has begun; and
in response to the second scrolling action, displaying the pre-decoded media item via a display interface.

21. The method of claim 11, wherein the decoded data is stored in the system heap included in the second memory.

* * * * *